May 1, 1951 H. B. S. BRABHAM 2,550,960

TELEVISION RECEIVER CONTRAST AND BRIGHTNESS CONTROL

Filed Feb. 12, 1948

INVENTOR.
HUGH B.S. BRABHAM

BY John A. Harvey

ATTORNEY

Patented May 1, 1951

2,550,960

UNITED STATES PATENT OFFICE 2,550,960

TELEVISION RECEIVER CONTRAST AND BRIGHTNESS CONTROL

Hugh B. S. Brabham, Wembley, England, assignor to Hazeltine Research, Inc., Chicago, Ill., a corporation of Illinois Application February 12, 1948, Serial No. 7,769
In Great Britain May 21, 1947

2 Claims. (Cl. 178—7.5)

Figure 1:
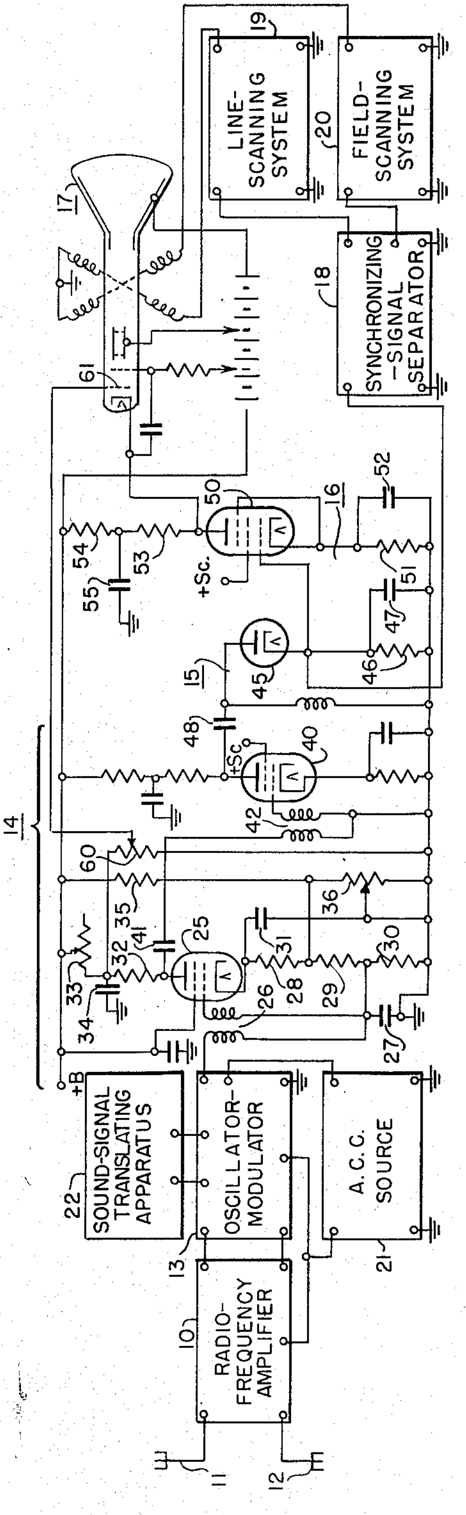

The present invention relates to television receivers and is particularly directed to the improvement of their contrast-brightness characteristics. The expression "contrast-brightness characteristics" is used to mean the correlated effects of contrast and brightness adjustments in the receiver and, specifically, to denote the effects on the brightness of the reproduced image occasioned by variations in the contrast.

It has been found that the eye of an observer is responsive primarily to the contrast or ratio between illumination values rather than to the absolute value of any given shade of illumination. For this reason, it is desirable to provide in a television receiver an arrangement for adjusting the extremes of the values of illumination in the reproduced image. Such an adjustment is referred to as a "contrast control" and permits adjustment of the receiver in accordance with conditions of reception and the type of picture being received. It usually is in the nature of a gain-control adjustment associated with the amplifying stages preceding the reproducing device.

It is also desirable to include in the receiver a brightness control so that a given signal amplitude corresponding to a particular shade value of the televised image, such as its black level, is established at a desired point with respect to the signal input-brightness characteristic of the reproducing device. This operating requirement is desirable in order that signal components representing other shade levels shall appear with the proper relative light values in the reproduced image. Usually, the brightness control takes the form of a potential divider or the like for determining an operating bias potential of the reproducing device. It is further desirable to correlate the adjustments of the contrast and brightness controls so that the various shade levels in the reproduced image retain their true relative values with contrast adjustments.

In conventional receivers of one type, the television signal as applied to the picture-reproducing device is stabilized with respect to the peaks of its synchronizing-signal components and contrast regulation is achieved by an automatic gain control included in one of the video-frequency amplifier stages. Such an arrangement does not preserve the contrast-brightness characteristic of the receiver as uniform as may be desired in certain installations. This is because the black level of the television signal varies relative to the peaks of the synchronizing components as the contrast control is adjusted. As a consequence, the black level also varies relative to its desired point on the signal input-brightness characteristic of the reproducing device. Accordingly, with such receivers a compensating adjustment of the brightness control is necessary any time the contrast is varied if the black level is to be maintained fixed with respect to the desired operating point on the signal input-brightness characteristic of the reproducing device.

In another prior receiver, the contrast control is in the form of an adjustable voltage divider associated with a video-frequency amplifier, while an adjustable potentiometer coupled to the cathode of a cathode-ray reproducing tube functions as a brightness control. These adjustable elements are mechanically interconnected and unicontrolled, whereby the brightness setting is compensated for each variation in the contrast control to keep the black level fixed with respect to a given operating point on the signal input-brightness characteristic of the reproducing device. This arrangement performs satisfactorily only when the intensity of the received signal at the detector of the receiver is closely maintained at a fixed value. Further, it necessitates the use of unicontrol mechanisms which may be undesirable.

Still other receivers are provided with auxiliary arrangements which stabilize the video signal, prior to application thereof to the image-reproducing device, with respect to an amplitude level which represents black shade value of the transmitted image. In such arrangements, black level of the signal is maintained at a fixed point on the signal input-brightness characteristic of the reproducing device and the contrast may be adjusted without any need for compensating changes in the adjustment of the brightness control. The present invention achieves essentially the same result but with a circuit arrangement that is more simplified and less expensive than those of such other prior arrangements.

It is an object of the present invention, therefore, to provide a television receiver having an improved arrangement for maintaining a desired contrast-brightness characteristic for the image-reproducing device.

It is another object of the invention to provide a television receiver having an arrangement of simplified and inexpensive construction for establishing a desired contrast-brightness characteristic for the image-reproducing device.

It is a further object of the invention to provide a television receiver having an improved and simplified brightness control which is self-compensating for contrast adjustments.

In accordance with the invention, a television receiver comprises a controllable-gain amplifier, including a vacuum tube having an anode electrode, for amplifying a television signal from which video-frequency components may be derived and an adjustable gain control included in the amplifier. The receiver further includes a cathode-ray tube having input electrodes coupled to the amplifier and responsive to the video-frequency components and having a given signal input-brightness characteristic for reproducing images in response to the video-frequency components and with a contrast determined by the adjustment of the gain control. A circuit arrangement is provided for applying an operating bias to the input electrodes of the cathode-ray tube. This arrangement comprises an impedance, bypassed for video-frequency components of the television signal, for connecting the anode electrode to a unidirectional potential source and for developing a first component of bias potential having a value varying substantially linearly with adjustments of the gain control. The arrangement further comprises a brightness control potential divider, connected in series relation with the impedance across the potential source, for developing an adjustably fixed component of bias potential of such value that the net operating bias applied to the cathode-ray tube establishes at a preselected point on its brightness characteristic that amplitude level of the amplified video-frequency components which represents a predetermined shade level of the televised image.

For a better understanding of the present invention, together with other and further objects thereof, reference is had to the following description taken in connection with the accompanying drawing, and its scope will be pointed out in the appended claims.

Figure 2:
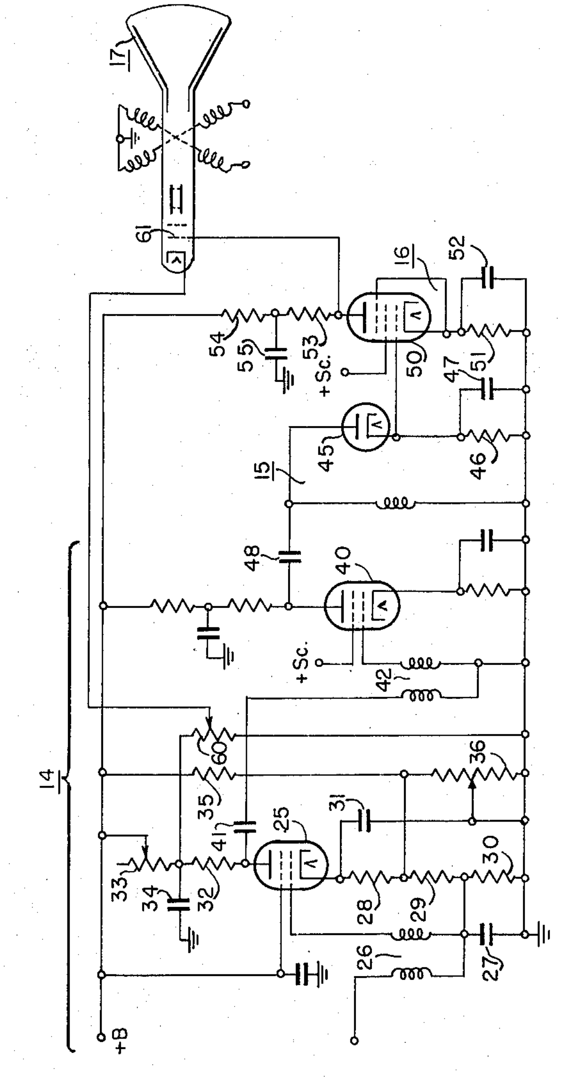

In the drawing, Fig. 1 is a circuit diagram, partly schematic, of a complete television carrier-wave signal receiver embodying the invention and arranged for the translation of positively modulated signals, while Fig. 2 represents a portion of the receiver of Fig. 1 modified to accommodate negatively modulated television signals.

Referring now more particularly to Fig. 1, the television carrier-wave signal receiver there represented is of the superheterodyne type and is intended to utilize positively modulated television signals in which increasing amplitude values designate picture components of increasing illumination. This receiver includes a radio-frequency amplifier 10 of any desired number of stages having its input circuit coupled to an antenna system 11, 12. The output circuit of the radio-frequency amplifier 10 is coupled to an oscillator-modulator 13. Coupled in cascade with the oscillator-modulator 13, in the order named, are an intermediate-frequency amplifier 14 of one or more stages, a detector 15, and a video-frequency amplifier 16, each of which will be considered in more detail hereinafter. An image-reproducing device 17 of the cathode-ray tube type is connected to the output circuit of the video-frequency amplifier 16. There is also coupled to detector 15 a synchronizing-signal separator 18. Output circuits of the separator 18 at which separated synchronizing signals appear are coupled to a line-scanning system 19 and a field-scanning system 20. The output circuits of these scanning systems, in turn, are coupled to appropriate beam-deflecting windings associated with the tube 17. An automatic-contrast-control (A. C. C.) source 21 is also coupled to the oscillator-modulator 13 and its output circuit is coupled to the input circuit of one or more of the tubes of the radio-frequency amplifier 10 and the oscillator-modulator 13 in conventional manner.

A sound-signal translating apparatus 22 is coupled to another output circuit of the oscillator-modulator 13. It may include one or more stages of intermediate-frequency amplification, a detector, one or more stages of audio-frequency amplification, and a sound-reproducing device.

It will be understood that the various components thus far described, with the exception of the brightness-contrast contral arrangement for the cathode-ray tube 17, may be of any conventional construction and operation. The details of such components are well known in the art rendering a further description thereof unnecessary.

Considering briefly the operation of the receiver as a whole and neglecting for the moment the specific operation of the brightness-contrast control arrangement, a desired modulated carrier-wave television signal is intercepted by the antenna system 11, 12. This signal is selected and amplified in the radio-frequency amplifier 10 and is applied to the oscillator-modulator 13 where it is converted to an intermediate-frequency signal. The intermediate-frequency signal is selectively amplified in the amplifier 14 and is detected by the detector 15 to derive the modulation components thereof. These modulation components, which comprise synchronizing components and video-frequency components, are applied to the video-frequency amplifier 16 for amplification. Thereafter they are applied to the input circuit of the image-reproducing tube 17 to modulate the intensity of the electron beam thereof in accordance with the video-frequency components. The synchronizing-signal components of the received signal are separated from the video-frequency components thereof in the separator 18 and are used to synchronize the operation of the line-scanning and field-scanning systems 19 and 20, respectively. These systems generate scanning signals of saw-tooth wave form which are properly synchronized with reference to the received signal and are applied to the beam-deflecting windings associated with the image reproducer, thereby to deflect the cathode-ray beam of the tube 17 in two directions normal to each other to reproduce the received television image.

The automatic-contrast-control or A. C. C. signal derived in unit 21 is effective to control the amplification of one or more of units 10 and 13 to maintain the signal input to the intermediate-frequency amplifier 14 within a relatively narrow range for a wide range of received signal intensities.

The sound-signal modulated carrier wave accompanying the desired vision-modulated carrier wave is also intercepted by the antenna system 11, 12. It is selected and amplified in the radio-frequency amplifier 10 and is applied to the oscillator-modulator 13 where it is converted to a sound-modulated intermediate-frequency signal. The sound-modulated intermediate-frequency signal is applied to the sound-signal translating apparatus 22 wherein it is amplified and detected to derive the modulation components which are further amplified and reproduced by the sound-reproducing device.

Referring now more particularly to the improved arrangement for effecting adjustments of the contrast and brightness of the image reproduced by the receiver, this arrangement comprises a controllable-gain carrier-wave amplifier for amplifying a carrier-wave television signal. The expression "carrier-wave amplifier" is intended to designate an amplifier for translating a modulated carrier-wave television signal prior to final detection and may be either a radio-frequency or an intermediate-frequency amplifier.

In the present embodiment of the invention, the contrast-brightness control arrangement is incorporated in one stage of a two-stage intermediate-frequency amplifier 14 although it will be understood that this amplifier may have as many stages as desired. The first such stage is provided by a vacuum tube 25 of the tetrode type having input electrodes coupled to the output circuit of the oscillator-modulator 13 through a transformer 26 and a condenser 27. The cathode circuit of the tube 25 includes in series self-biasing resistors 28 and 29, and is completed to ground through a third resistor 30, these resistors being by-passed for intermediate-frequency components by a condenser 31. The anode circuit of the tube 25 includes an anode-load impedance 32 and is coupled to a unidirectional potential source, indicated +B, through an additional impedance shown as a variable resistor 33 which is decoupled for video-frequency components by a by-pass condenser 34. A voltage-divider network, provided by a fixed resistor 35 and a variable resistor 36, is connected across the unidirectional potential source and by a circuit connection between the junction of the resistors 35, 36 and the junction of the resistors 28 and 29 forms with the resistors 29 and 30 of the cathode circuit an adjustable gain control included in the first stage of the intermediate-frequency amplifier.

The second intermediate-frequency amplifier stage, including a tetrode type of tube 40, is essentially similar to the one just described but operates with a substantially fixed gain. It has an input circuit coupled to the output circuit of the preceding stage through a condenser 41 and a transformer 42.

The detector 15 is of conventional construction and includes a diode rectifier 45 and a load resistor 46 by-passed for intermediate frequencies by a condenser 47. The detector is coupled through a condenser 48 to the output circuit of the last stage of the intermediate-frequency amplifier 14.

The video-frequency amplifier 16 is also of conventional construction, including a pentode type of tube 50 having input electrodes which are conductively connected across the load impedance 46 of the detector 15 through a biasing resistor 51 by-passed by a condenser 52. The tube 50 has an anode-load impedance 53 and is coupled to the unidirectional source +B through a decoupling resistor 54 by-passed by a condenser 55. The cathode of the reproducing tube 17 is directly connected with the anode of the video-frequency amplifier 50.

The contrast-brightness characteristic of the cathode-ray tube 17 is under the control of a circuit arrangement for applying to the input electrode of the cathode-ray tube an operating bias which includes two components. The first of these components is a bias potential having a value varying substantially linearly with adjustments of the gain control of the intermediate-frequency amplifier 25. The second component is an adjustably fixed component of bias potential of such value that, when the first and second components are combined in the input circuit of the cathode-ray tube 17, the net operating bias applied to the tube establishes at a preselected point on the signal input-brightness characteristic thereof that amplitude level of the amplified television signal which represents a predetermined shade level of the televised image, such as its black level. Although these two components of bias potential may be developed in circuits which are electrically independent of one another and may be combined in the input circuit of the cathode-ray tube 17 with or without previous amplification, a convenient and inexpensive arrangement is that shown in the drawing wherein the bias components are developed in one series circuit included in the first intermediate-frequency amplifier stage.

More specifically, the present circuit arrangement comprises the resistor 33 in the anode circuit of the tube 25 for developing the component of bias potential varying with adjustments of the gain control of that tube. It further comprises a brightness-control potentiometer 60 for developing the adjustably fixed component of bias potential. The potentiometer 60 is also included in the first stage of the intermediate-frequency amplifier, being connected in series relation with impedance 33 across the potential source +B. The adjustable tap of the potentiometer 60 is conductively connected with the brilliancy-control electrode 61 of the cathode-ray tube 17, and the low-potential terminal of the potentiometer is coupled with the cathode of the cathode-ray tube through the space-current path of the video-frequency amplifier 50.

In considering the operation of the described arrangement for determining the contrast-brightness characteristic of the receiver, it will be assumed that the tube 25 operates on the linear portion of its input-output characteristic and that its anode current has a direct-current component which varies substantially linearly with variations in the over-all gain, as measured between the input circuit of the intermediate-frequency amplifier 14 and the cathode-ray tube 17, effected by adjustments of the gain control provided by resistors 29, 30 and 36. For any particular setting of the contrast-control resistor 36, the brightness-control potentiometer 60 may be so adjusted that the net operating bias applied to the cathode-ray tube 17 establishes that amplitude level of the television signal which represents black level of the televised image at approximately cutoff of the cathode-ray beam. With such an adjustment, the cathode-ray tube 17 responds to the translated television signal and reproduces images with a contrast determined by the setting of the contrast-control resistor 36. Signal levels of the applied television signal which corresponds to black, or to blacker than black as during the synchronizing-signal intervals, bias the cathode-ray tube to anode-current cutoff. The cathode-ray tube therefore synthesizes the translated images in the desired way.

If the contrast-control resistor 36 is thereafter adjusted to establish a different contrast in the reproduced image, the direct-current component of the anode current of the intermediate-frequency amplifier tube 25 is modified accordingly. Since the resistor 33 is by-passed for video-frequency components, the voltage developed thereacross is a measure of the direct-current component of the anode current of the tube 25. Therefore, the adjustment of the contrast control is manifested by a change in the potential developed across the active portion of the resistor 33. The potential developed by the resistor 33 changes in a linear fashion with and in the same sense as the gain of the tube 25 with adjustments of the contrast control. Inasmuch as the brightness-control potentiometer 60 is connected in series with the resistor 33 across the unidirectional potential source +B, the net operating bias applied to the input electrodes of the cathode-ray tube 17 is correspondingly modified to maintain signal levels of the amplified television signal in the proper relation with respect to the signal input-brightness characteristic of the cathode-ray tube. In other words, amplitude levels of the amplified television signal which represent black shade of the televised image are retained at that point on the brightness characteristic of the cathode-ray tube which corresponds with anode-current cutoff even though the contrast-control resistor 36 is adjusted to vary the contrast of the reproduced image.

Theoretically, the net bias potential required for the cathode-ray tube 17 to maintain the black-level amplitude of the amplified television signal at anode-current cutoff even with adjustments of the contrast control is realized by satisfying two conditions. The first condition is defined by the following expression:

$$R_1(1-n_2)=r.a/b \qquad (1)$$

where $R_1$ is the value of resistance of that part of the resistor 33 traversed by the anode current of the tube 25; $n_2$ is the ratio of that part of the potentiometer 60 between its tap and the junction of the potentiometer and the resistor 33 to the whole of the potentiometer 60; $r$ is the slope of the gain-control characteristic of the tube 25 obtained by plotting the change in unidirectional voltage (V) on the cathode of the tube against the mean value of the anode current (I) as effected by adjustment of the contrast-control resistor 36 for a constant peak-to-peak value of intermediate-frequency signal supplied to the input circuit of the tube 25; and the constant $a/b$ is a factor determined by the specifications of the television signal designating the relative amplitude level of that signal which corresponds to black shade level of the televised image. In television systems utilizing positive modulation, the factor $a/b$ is the ratio of the amplitude corresponding to the black level divided by that corresponding to full white. For the case of positive modulation, especially as practiced in England, the factor $a/b$ is approximately equal to 0.3. The operating conditions defined by Equation 1 are effective so long as the ratio $R_1/R_2$ is negligible compared with $n_2$, wherein $R_2$ is the total value of resistance of the potentiometer 60.

The second condition to be satisfied is defined as follows:

$$n_2=(V_c+V_b+V_o a/b)/V_{H.T.} \qquad (2)$$

where $V_c$ is the value of the potential between the cathode of the cathode-ray tube 17 and the high-potential terminal of the unidirectional source +B in the absence of an applied television signal; $V_b$ is the value of bias potential required to bias the cathode-ray tube 17 to anode-current cutoff; $V_o$ is related to the gain-control characteristic discussed in the preceding paragraph and is expressed by the relation $V=V_o+rI$; and $V_{H.T.}$ is the value of potential between the high-potential terminal of the unidirectional potential source +B and the reference ground potential.

The present invention may also be employed in receivers designed to utilize negatively modulated television signals in which increasing amplitude values denote decreasing shades of illumination. The significant circuit modifications required to convert the receiver of Fig. 1 to one for translating negatively modulated signals are indicated in Fig. 2 which shows the anode circuits of the amplifier tubes 25, 40 and 50 as well as the connections to the input electrodes of the cathode-ray tube 17. It will be seen that for this embodiment the brilliancy-control electrode 61 of the cathode-ray tube is directly connected to the anode terminal of the video-frequency amplifier 50 while its cathode is connected to the adjustable tap of the potentiometer 60. Otherwise, the circuits of the intermediate-frequency amplifier 14, the detector 15, the video-frequency amplifier 16, and the cathode-ray tube 17 are the same as in Fig. 1. Accordingly corresponding parts of the circuits of Figs. 1 and 2 are identified by similar reference characters.

The described arrangements are effective automatically to maintain the black-level amplitude of the television signal at a preselected point on the signal input-brightness characteristic of the cathode-ray tube 17 even though the gain-control resistor 36 is adjusted to achieve any desired contrast within the operating limitations of the gain adjustment. For optimum results, it is preferred that the receiver include an A. C. C. source, as explained above, to maintain the intensity of the intermediate-frequency signal supplied to amplifier 14 at a substantially fixed value. Each arrangement is exceedingly simple in construction and establishes a desired contrast-brightness characteristic for the television receiver with small additional expense.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A television receiver comprising: a controllable-gain carrier-wave amplifier, including a vacuum tube having an anode electrode, for amplifying a carrier-wave television signal from which video-frequency components may be derived; an adjustable gain control included in said amplifier; a cathode-ray tube, having input electrodes coupled to said amplifier and responsive to said video-frequency components and having a given signal input-brightness characteristic, for reproducing images in response to said video-frequency components and with a contrast determined by the adjustment of said gain control; and a circuit arrangement for applying an operating bias to said input electrodes comprising an impedance, by-passed for video-frequency components of said television signal, for connecting said anode electrode to a unidirectional potential source and for developing a first component of bias potential having a value varying substantially linearly with adjustments of said gain control and further comprising a brightness control potential divider, connected in series relation with said impedance across said potential source, for developing an adjustably fixed component of bias potential of such value that the net operating bias potential applied to said cathode-ray tube establishes at a preselected point on said brightness characteristic the amplitude level of the amplified video-frequency components which represents a predetermined shade level of the televised image.

2. A television receiver comprising: a controllable-gain carrier-wave amplifier, including a vacuum tube having an anode electrode, for amplifying a carrier-wave television signal from which video-frequency components may be derived; an adjustable gain control included in said amplifier; a cathode-ray tube, having input electrodes coupled to said amplifier and responsive to said video-frequency components and having a given signal input-brightness characteristic, for reproducing images in response to said video-frequency components and with a contrast determined by the adjustment of said gain control; and a circuit arrangement for applying an operating bias to said input electrodes comprising an impedance, by-passed for video-frequency components of said television signal, for connecting said anode electrode to a unidirectional potential source and for developing a first component of bias potential having a value varying substantially linearly with adjustments of said gain control and further comprising a brightness-control potential divider, connected in series relation with said impedance across said potential source and coupled serially therewith between said input electrodes, for developing an adjustably fixed component of bias potential of such value that the net operating bias potential applied to said cathode-ray tube establishes at a preselected point on said brightness characteristic the amplitude level of the amplified video-frequency components which represents a predetermined shade level of the televised image.

HUGH B. S. BRABHAM.

REFERENCES CITED

The following references are of record in the file of this patent:

UNITED STATES PATENTS

| Number | Name | Date |
|---|---|---|
| 2,137,263 | Bowman-Manifold | Nov. 22, 1938 |
| 2,204,992 | Holmes | June 18, 1940 |
| 2,255,484 | Dome | Sept. 9, 1941 |
| 2,269,540 | Loughren | Jan. 13, 1942 |
| 2,280,670 | Spielman | Apr. 21, 1942 |
| 2,438,420 | Scoles et al. | Mar. 23, 1948 |

FOREIGN PATENTS

| Number | Country | Date |
|---|---|---|
| 510,715 | Great Britain | Aug. 4, 1939 |
| 845,897 | France | Sept. 4, 1939 |
| 851,411 | France | Jan. 9, 1940 |